United States Patent
Shi (10) Patent No.: US 11,051,197 B2
(45) Date of Patent: Jun. 29, 2021

(54) MESSAGE PROCESSING METHOD AND APPARATUS, RADIO ACCESS NETWORK DEVICE AND STORAGE MEDIUM

(71) Applicant: ZTE CORPORATION

(72) Inventor: Xiaojuan Shi, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 131 days.

(21) Appl. No.: 16/605,943

(22) PCT Filed: Mar. 28, 2018

(86) PCT No.: PCT/CN2018/080899
§ 371 (c)(1),
(2) Date: Oct. 17, 2019

(87) PCT Pub. No.: WO2018/192349
PCT Pub. Date: Oct. 25, 2018

(65) Prior Publication Data
US 2020/0077290 A1    Mar. 5, 2020

(30) Foreign Application Priority Data
Apr. 18, 2017    (CN) .......................... 201710254024.3

(51) Int. Cl.
*H04W 24/10*    (2009.01)
*H04B 7/0456*   (2017.01)
(Continued)

(52) U.S. Cl.
CPC .......... *H04W 24/10* (2013.01); *H04B 7/0478* (2013.01); *H04W 24/02* (2013.01); *H04W 56/0015* (2013.01)

(58) Field of Classification Search
CPC . H04W 24/10; H04W 56/0015; H04W 24/02; H04B 7/0478
See application file for complete search history.

(56) References Cited

U.S. PATENT DOCUMENTS 10,644,777 B2 *  5/2020  Baligh ................ H04B 7/0626
2009/0017828 A1  1/2009  Lee et al.
(Continued)

FOREIGN PATENT DOCUMENTS

CN    102883356 A    1/2013
CN    106134124 A    11/2016
(Continued)

OTHER PUBLICATIONS

International Search Report for corresponding application PCT/CN2018/080899 filed on Mar. 28, 2018; dated Jun. 15, 2018.

*Primary Examiner* — Zhiren Qin
(74) *Attorney, Agent, or Firm* — Cantor Colburn LLP (57) ABSTRACT

Provided are a message processing method and apparatus, a radio access network device, and a storage medium. The method includes: after receiving information about a first measurement signal of a second radio access network device reported by a terminal, a first radio access network device performing following operations: determining whether to send a first message to the second radio access network device according to obtained association information and first information, where the association information indicates association between the first measurement signal and a second measurement signal of the second radio access network device, and the first information indicates whether the second measurement signal is being sent; or sending the first message to the second radio access network device. The first message carries the information about the first measurement signal.

7 Claims, 6 Drawing Sheets

(51) Int. Cl.
*H04W 24/02* (2009.01)
*H04W 56/00* (2009.01)

(56) References Cited

U.S. PATENT DOCUMENTS

| | | |
|---|---|---|
| 2016/0156401 A1 | 6/2016 | Onggosanusi et al. |
| 2018/0287860 A1* | 10/2018 | Xia ..................... H04L 41/0654 |
| 2019/0037604 A1* | 1/2019 | Akkarakaran ...... H04W 74/004 |
| 2019/0082438 A1* | 3/2019 | Wilson ................ H04W 72/042 |
| 2020/0288472 A1* | 9/2020 | Chen ..................... H04L 5/0023 |
| 2020/0344651 A1* | 10/2020 | Yang ................ H04W 36/0058 |

FOREIGN PATENT DOCUMENTS

| | | |
|---|---|---|
| CN | 106332195 A | 1/2017 |
| WO | 2014019191 A1 | 2/2014 |

* cited by examiner

MESSAGE PROCESSING METHOD AND APPARATUS, RADIO ACCESS NETWORK DEVICE AND STORAGE MEDIUM

CROSS-REFERENCES TO RELATED APPLICATIONS

This application is based on and claims priority to Chinese patent application No. 201710254024.3 filed on Apr. 18, 2017, the disclosure of which is incorporated therein by reference in its entirety.

TECHNICAL FIELD

The present disclosure relates to the field of communications and, in particular, to a message processing method and apparatus, a radio access network device, and a storage medium.

BACKGROUND

In a traditional radio communication system such as a Long Term Evolution (LTE) system, a Cell Reference Signal (CRS) used by a User Equipment (UE) for measuring a cell is sent on each downlink subframe over each Physical Resource Block (PRB), and the CRS is sent at a fixed time-frequency domain position. In such design mode, the CRS occupies many time-frequency domain resources. As a result, on one hand, the time-frequency domain resources available for other channels such as a Physical Downlink Shared Channel (PDSCH) for downlink data transmission is reduced; on the other hand, such mode is not favorable for forward compatibility, that is, when new requirements or new functions are introduced, the mode is not favorable for physical layer design aiming at these new requirements or new functions; and on the other hand, the mode is not favorable for the energy saving of the base station.

To overcome the above-mentioned drawbacks in the traditional radio communication system, when a 5th-Generation (5G) mobile communication new system is designed, an important objective is to reduce always-on signals sent at fixed time-frequency domain positions on a cell. Synchronization signals and associated measurement signals adopted by the UE for cell measurements are redesigned.

For the synchronization signals, since the UE needs to discover the cell based on the detection of the synchronization signal, at least a part of the synchronization signals in 5G still need to be sent in the manner of always-on, and this part of synchronization signals may be referred to as default synchronization signals whose sending period (default period) is fixed and whose sending position in the time-frequency domain is fixed. When the UE performs initial cell search, the UE can at least discover a cell by detecting a default synchronization signal. In addition to the default synchronization signals, in order to adapt to the requirements of different 5G deployment scenarios and different service scenarios, synchronization signals sent in the non-always-on manner may be designed, and these synchronization signals are sent only when needed in the network. When the UE only knows the configuration information of the default synchronization signal, the UE performs cell search based on the default synchronization signal, where the configuration of the default synchronization signal is standardized in the protocol, and thus the UE knows by default. In addition, if the network notifies, through a system message or dedicated signaling, the UE of "synchronization signal configuration information" including a synchronization signal sending period, sending time and a sending window in the sending period, etc., the UE does not perform the synchronization signal detection based on the configuration information of the default synchronization signal, but performs the synchronization signal detection based on the received "synchronization signal configuration information".

In the traditional radio communication system, for example, LTE, a synchronization signal is used by a UE for discovering a cell, including acquiring time and frequency synchronization with the cell, identifying a cell identity, detecting a length of a Cyclic Prefix (CP), and the like. To enable the UE to measure the cell, the traditional radio communication system, for example, LTE, also introduces a CRS in addition to the synchronization signal. In the 5G system, in order to reduce the sending of the always-on signals, the CRS is not designed any more, and the synchronization signal may also be used for the UE to measure the cell, that is, in the 5G system, the synchronization signal is also a measurement signal, and whether the UE is in an idle state or a connected state, the cell can be measured based on the synchronization signal.

A low frequency band, particularly frequencies lower than 6 GHz, is used in the traditional radio communication system, for example, LTE. Whereas in the 5G system, frequencies higher than 6 GHz will be used in order to provide higher data transmission rates and throughput, for example, 3GPP has determined that High frequencies up to 52.6 GHz will be used. High frequencies have the characteristics of high path loss, high air absorption (oxygen absorption, rain fading, fog fading), and sensitivity to shadow fading. Therefore, in order to ensure radio coverage of high frequencies, beamforming techniques will be used in the 5G system employing high frequencies, and particularly channels, such as PDSCHs, used for data transmission in a connected state will be sent through beamforming. As a common signal of a cell, the synchronization signal is used by a UE for discovering a cell and performing measurement, and may be sent through a Single Frequency Network (SFN) and may also be sent through beamforming. However, considering the overhead of sending the synchronization signal, even if the synchronization signal is sent through beamforming, the beam of the synchronization signal may be designed wider than the beam of a data channel such as a PDSCH, so when the UE is in a connected state, the signal quality of the actual data channel (e.g., PDSCH) may not be reflected based on the measurement result of the synchronization signal. In addition, similarly considering the overhead of sending the synchronization signal, the sending density of the synchronization signal is relatively sparse, and therefore, when the UE is in a connected state, the measurement accuracy may not be enough to meet the accuracy requirement of mobility management in the connected state based on the measurement result of the synchronization signal. For this reason, in the 5G system, other measurement signals, such as a Channel State Information Reference Signal (CSI-RS) (which is merely an example and other reference signals are not excluded, and which is replaced by a CSI-RS for convenience of description hereinafter) are additionally introduced in the connected state, and the measurement signals are only used for measurement by the connected-state UE. Measurement signals introduced in the connected state are not sent in the always-on manner, and are sent only when it is determined that the measurement signals need to be sent in the network.

In the 5G system, two types of measurement signals, i.e., synchronization signals and CSI-RSs, are designed in the connected state, but how to use these two types of measurement signals, especially how to efficiently use non-always-on CSI-RSs has not be solved yet.

In view of the above technical problems in the related art, no effective solution has yet been proposed.

SUMMARY

Embodiments of the present disclosure provide a message processing method and apparatus, a radio access network device and a storage medium to solve at least the problem of how to efficiently use non-always-on measurement signals in the related art.

An embodiment of the present disclosure provides a message processing method. The method includes: after receiving information about a first measurement signal of a second radio access network device reported by a terminal, a first radio access network device performing at least one of the following operations: determining whether to send a first message to the second radio access network device according to association information and first information that have been obtained, where the association information indicates association between the first measurement signal of the second radio access network device and a second measurement signal of the second radio access network device, and first information indicates whether the second measurement signal of the second radio access network device is being sent; or sending the first message to the second radio access network device. The first message carries the information about the first measurement signal of the second radio access network device reported by the terminal.

An embodiment of the present disclosure provides a message processing apparatus. The apparatus includes: a receiving module configured to receive information about a first measurement signal of a second radio access network device reported by a terminal; and a processing module configured to perform at least one of following operations: determining whether to send a first message to the second radio access network device according to association information and first information that have been obtained, where the association information indicates association between the first measurement signal of the second radio access network device and a second measurement signal of the second radio access network device, and the first information indicates whether the second measurement signal of the second radio access network device is being sent; or sending the first message to the second radio access network device, where the first message carries the information about the first measurement signal of the second radio access network device reported by the terminal.

An embodiment of the present disclosure provides a first radio access network device. The device includes a processor and a memory coupled to the processor. The processor is configured to receive information about a first measurement signal of a second radio access network device reported by a terminal and perform at least one of the following operations: determining whether to send a first message to the second radio access network device according to association information and first information that have been obtained, where the association information indicates association between the first measurement signal of the second radio access network device and a second measurement signal of the second radio access network device, and the first information indicates whether the second measurement signal of the second radio access network device is being sent; or sending the first message to the second radio access network device, where the first message carries the information about the first measurement signal of the second radio access network device reported by the terminal.

An embodiment of the present disclosure further provides a storage medium. The storage medium includes a stored program, where when the program is run, any message processing method described above is executed.

An embodiment of the present disclosure further provides a processor. The processor is configured to run a program, where when the program is run, any message processing method described above is executed.

According to the embodiments provided in the present disclosure, the first message is not sent to the second radio access network device in some cases. Therefore, according to whether the first message is received, the second radio access network device can determine whether to start sending the second measurement signal, and thus the problem of how to efficiently use the non-always-on measurement signals in the related art can be solved, and the utilization efficiency of resources is improved.

BRIEF DESCRIPTION OF DRAWINGS

The drawings described herein are used to provide a further understanding of the present disclosure and form a part of the present application. The exemplary embodiments and descriptions thereof in the present disclosure are used to explain the present disclosure and not to limit the present disclosure in any improper way. In the drawings.

DETAILED DESCRIPTION

The present disclosure will be described hereinafter in detail with reference to the drawings in conjunction with the embodiments. It is to be noted that if not in collision, the embodiments and features therein in the present application may be combined with each other.

It is to be noted that the terms "first", "second" and the like in the description, claims and drawings of the present disclosure are used to distinguish between similar objects and are not necessarily used to describe a particular order or sequence.

Embodiment 1

Figure 1:
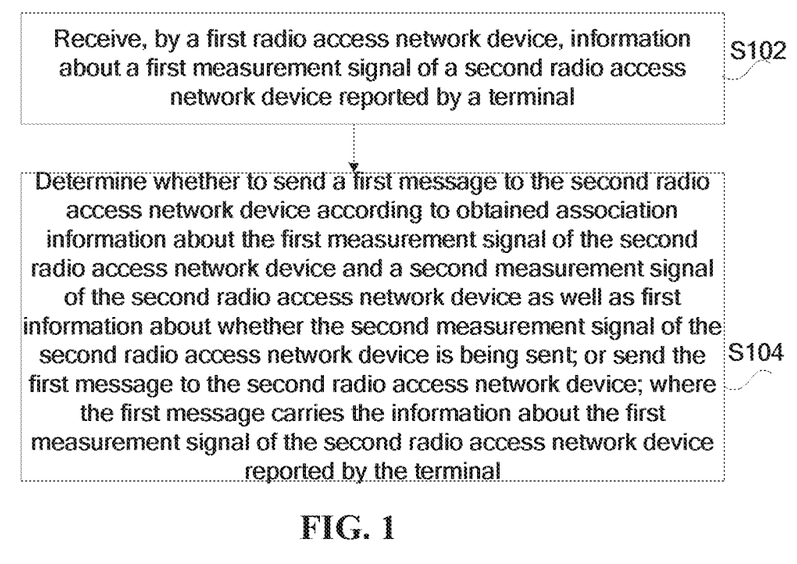
FIG. 1 is a flowchart illustrating a message processing method according to an embodiment of the present disclosure.

The present embodiment provides a message processing method. FIG. 1 is a flowchart illustrating the message processing method according to the embodiment of the present disclosure. As shown in FIG. 1, the method includes steps described below.

In step S102, a first radio access network device receives information about a first measurement signal of a second radio access network device reported by a terminal.

In step S104, at least one of the following operations is performed: it is determined, according to association information and first information that have been obtained, whether to send a first message to the second radio access network device, where the association information indicates association between the first measurement signal of the second radio access network device and a second measurement signal of the second radio access network device, and the first information indicates whether the second measurement signal of the second radio access network device is being sent; or the first message is sent to the second radio access network device; where the first message carries the information about the first measurement signal of the second radio access network device reported by the terminal.

Through the above steps, after the first radio access network device receives the information about the first measurement signal of the second radio access network device reported by the terminal, at least one of the following operations is performed: it is determined, according to association information and first information that have been obtained, whether to send a first message to the second radio access network device, where the association information indicates association between the first measurement signal of the second radio access network device and a second measurement signal of the second radio access network device, and the first information indicates whether the second measurement signal of the second radio access network device is being sent; or the first message is sent to the second radio access network device; where the first message carries the information about the first measurement signal of the second radio access network device reported by the terminal. Therefore, the first message may be sent to the second radio access network device in some cases and the first message may not be sent to the second radio access network device in other cases, so that the second radio access network device can determine whether to start sending the second measurement signal according to whether the first message is received, and thus the problem of how to efficiently use the non-always-on measurement signals in the related art can be solved, and the utilization efficiency of resources is improved.

It is to be noted that the first measurement signal described above may be a measurement signal used by a terminal in idle-state for measurement and/or used by a terminal in connected-state for measurement. The first measurement signal may be, for example, a synchronization signal, but is not limited thereto. It is to be noted that the first measurement signal described above may be an always-on measurement signal, but is not limited thereto. The second measurement signal described above may be a measurement signal, such as a CSI-RS, used by a terminal in connected-state for measurement, but is not limited thereto, and the second measurement signal described above may be a non-always-on measurement signal.

In another embodiment, determining, according to the association information and the first information, whether to send the first message to the second radio access network device may appear as: determining, according to the information about the first measurement signal of the second radio access network device reported by the terminal and the association information, the second measurement signal associated with the first measurement signal of the second radio access network device reported by the terminal; and deciding, according to the first information, whether the determined second measurement signal is being sent; in response to determining that the determined second measurement signal is not being sent, sending the first message to the second radio access network device; and in response to determining that the determined second measurement signal is being sent, not sending the first message to the second radio access network device.

It is to be noted that the first information described above includes information about whether the determined second measurement signal is being sent, but is not limited thereto.

It is to be noted that step S104 in which the first message is sent to the second radio access network device may appear as that: the first message is sent directly to the second radio access network device. For example, the first message may be sent to the second radio access network device when the association information is obtained, and the first message may also be sent to the second radio access network device when the association information has not been obtained, which is not limited thereto.

In another embodiment, after step S102, the method may further include: sending notification information to the terminal, where the notification information includes configuration information about the second measurement signal associated with the first measurement signal reported by the terminal.

It is to be noted that the configuration information about the second measurement signal associated with the first measurement signal reported by the terminal is acquired in at least one of the following manners. Manner 1: configuration information about the second measurement signal of the second radio access network device is acquired before it is determined, according to the association information and the first information, whether to send the first message to the second radio access network device, or before the first message is sent to the second radio access network device, where the configuration information about the second measurement signal of the second radio access network device includes: the configuration information about the second measurement signal associated with the first measurement signal reported by the terminal. Manner 2: in response to determining that the configuration information about the second measurement signal of the second radio access network device is not acquired before it is determined, according to the association information and the first information, whether to send the first message to the second radio access network device or before the first message is sent to the second radio access network device, a second message sent from the second radio access network device is received before the notification information is sent to the terminal, where the second message carries the configuration information about the second measurement signal associated with the first measurement signal reported by the terminal.

It is to be noted that the configuration information about the second measurement signal may include at least one of the following information:
- information about the second measurement signal: a beam identity of the second measurement signal or index information of the second measurement signal;
- information about a cell associated with the second measurement signal: the information about the cell being represented by a cell identity;
- a scrambling identity of the second measurement signal;
- information about the first measurement signal associated with the second measurement signal: a beam identity of the first measurement signal or a time index of a synchronization signal block of the first measurement signal;
- resource configure information of the second measurement signal; or
- an individual offset of the second measurement signal: the individual offset being used in evaluating signal quality of the second measurement signal.

It is to be noted that for the above manner 1, the configuration information about the second measurement signal of the second radio access network device may be acquired at the same time as the association information and/or the first information described above and may not be acquired at the same time, which is not limited.

It is to be noted that the configuration information about the second measurement signal associated with the first measurement signal reported by the terminal may be determined by the first radio access network device or may be determined by the second radio access network device.

In another embodiment, in response to determining that the association information is obtained before it is determined, according to the association information and the first information, whether to send the first message to the second radio access network device, or before the first radio access network device sends the first message to the second radio access network device, the second measurement signal associated with the first measurement signal reported by the terminal may be determined by the first radio access network device according to the first measurement signal reported by the terminal and the association information.

In another embodiment, in response to determining that the association information has not been obtained before the first radio access network device sends the first message to the second radio access network device, the second measurement signal associated with the first measurement signal reported by the terminal is determined by the second radio access network device according to the information about the first measurement signal carried in the first message and the association information stored in the second radio access network device.

It is to be noted that the association information may include at least one of: a corresponding relationship between the information about the first measurement signal and the information about the second measurement signal; or a Quasi-Co-Location relationship between the first measurement signal and the second measurement signal.

It is to be noted that the information about the first measurement signal may include at least one of: a beam identity of the first measurement signal; or a time index of a synchronization signal block of the first measurement signal.

It is to be noted that the information about the second measurement signal may include at least one of: a beam identity of the second measurement signal; or index information of the second measurement signal.

It is to be noted that the above steps may be performed by a radio access network device, such as a first radio access network device, but is not limited thereto.

From the description of the preceding implementation modes, it will be apparent to those skilled in the art that the methods in the embodiments described above may be implemented by software plus a necessary general-purpose hardware platform, or may of course be implemented by hardware. However, in many cases, the former is a preferred implementation manner. Based on this understanding, the solutions provided by the present disclosure substantially, or the part contributing to the related art, may be embodied in the form of a software product. The computer software product is stored in a storage medium (such as a ROM/RAM, a magnetic disk or an optical disk) and includes several instructions for enabling a terminal device (which may be a mobile phone, a computer, a server, a network device or the like) to execute the method according to each embodiment of the present disclosure.

Embodiment 2

The present embodiment further provides a message processing apparatus. The apparatus is used for implementing the embodiments and implementation modes described above. What has been described will not be repeated. As used below, the term "module" may be software, hardware or a combination thereof capable of implementing predetermined functions. The apparatus in the embodiment described below is preferably implemented by software, but implementation by hardware or by a combination of software and hardware is also possible and conceived.

Figure 2:
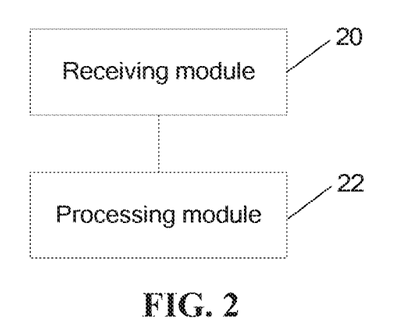
FIG. 2 is a structural block diagram illustrating a message processing apparatus according to an embodiment of the present disclosure.

FIG. 2 is a structural block diagram illustrating a message processing apparatus according to the embodiment of the present disclosure. As shown in FIG. 2, the apparatus includes a receiving module 20 and a processing module 22.

The receiving module 20 is configured to receive information about a first measurement signal of a second radio access network device reported by a terminal.

The processing module 22 is connected to the receiving module 20, and is configured to perform at least one of the following operations: determining, according to association information and first information that have been obtained, whether to send a first message to the second radio access network device, where the association information indicates association between the first measurement signal of the second radio access network device and a second measurement signal of the second radio access network device, and the first information indicates whether the second measurement signal of the second radio access network device is being sent; or sending the first message to the second radio access network device; where the first message carries the information about the first measurement signal of the second radio access network device reported by the terminal.

Through the above apparatus, the apparatus may send the first message to the second radio access network device in some cases and may not send the first message to the second radio access network device in other cases. Therefore, the second radio access network device can determine whether to start sending the second measurement signal according to whether the first message is received, and thus the problem of how to efficiently use the non-always-on measurement signals in the related art can be solved, and the utilization efficiency of resources is improved.

It is to be noted that the first measurement signal described above may be a measurement signal which may be used by a terminal in idle-state for measurement and/or a terminal in connected-state terminal for measurement. The first measurement signal may be, for example, a synchronization signal, but is not limited thereto. It is to be noted that the first measurement signal described above may be an always-on measurement signal, but is not limited thereto. The second measurement signal described above may be a measurement signal, such as a CSI-RS, used by a terminal in connected-state for measurement, but is not limited thereto, and the second measurement signal described above may be a non-always-on measurement signal.

In another embodiment, the processing module 22 may further be configured to determine, according to the information about the first measurement signal of the second radio access network device reported by the terminal and the association information, the second measurement signal associated with the first measurement signal of the second radio access network device reported by the terminal; and decide, according to the first information, whether the determined second measurement signal is being sent; in response to determining that the determined second measurement signal is not being sent, send the first message to the second radio access network device; and in response to determining that the determined second measurement signal is being sent, not send the first message to the second radio access network device.

It is to be noted that the first information described above includes information about whether the determined second measurement signal is being sent, but is not limited thereto.

In another embodiment, the above apparatus further includes: a sending module, which is connected to the receiving module 20 and is configured to send notification information to the terminal. The notification information includes: configuration information about the second measurement signal associated with the first measurement signal reported by the terminal.

It is to be noted that the above apparatus may further include an acquisition module, which is configured to acquire configuration information about the second measurement signal associated with the first measurement signal reported by the terminal in at least one of the following manners. Manner 1: configuration information about the second measurement signal of the second radio access network device is acquired before it is determined, according to the association information and the first information, whether to send the first message to the second radio access network device, or before the first message is sent to the second radio access network device, where the configuration information about the second measurement signal of the second radio access network device includes: the configuration information about the second measurement signal associated with the first measurement signal reported by the terminal. Manner 2: in response to determining that the configuration information about the second measurement signal of the second radio access network device has not been obtained before it is determined, according to the association information and the first information, whether to send the first message to the second radio access network device, or before the first message is sent to the second radio access network device, a second message sent from the second radio access network device is received before the notification information is sent to the terminal, where the second message carries the configuration information about the second measurement signal associated with the first measurement signal reported by the terminal.

It is to be noted that for the above manner 1, the configuration information about the second measurement signal of the second radio access network device may be acquired at the same time as the association information and/or the first information described above and may not be acquired at the same time, which is not limited.

It is to be noted that the configuration information about the second measurement signal associated with the first measurement signal reported by the terminal may be determined by the first radio access network device or may be determined by the second radio access network device.

In another embodiment, in response to determining that the association information is obtained before it is determined, according to the association information and the first information, whether to send the first message to the second radio access network device, or before the first radio access network device sends the first message to the second radio access network device, the second measurement signal associated with the first measurement signal reported by the terminal may be determined by the first radio access network device according to the first measurement signal reported by the terminal and the association information.

The configuration information about the second measurement signal may include at least one of the following information:
information about the second measurement signal: a beam identity of the second measurement signal or index information of the second measurement signal;
information about a cell associated with the second measurement signal: the information about the cell being represented by a cell identity;
a scrambling identity of the second measurement signal;
information about the first measurement signal associated with the second measurement signal: a beam identity of the first measurement signal or a time index of a synchronization signal block of the first measurement signal;
resource configure information of the second measurement signal; or
an individual offset of the second measurement signal: the individual offset being used in evaluating signal quality of the second measurement signal.

In another embodiment, in response to determining that the association information has not been obtained before the first radio access network device sends the first message to the second radio access network device, the second measurement signal associated with the first measurement signal reported by the terminal is determined by the second radio access network device according to the information about the first measurement signal carried in the first message and the association information stored in the second radio access network device.

It is to be noted that the association information may include at least one of: a corresponding relationship between the information about the first measurement signal and the information about the second measurement signal; or a Quasi-Co-Location relationship between the first measurement signal and the second measurement signal. The information about the first measurement signal may include at least one of: a beam identity of the first measurement signal; or a time index of a synchronization signal block of the first measurement signal. The information about the second measurement signal may include at least one of: a beam identity of the second measurement signal; or index information of the second measurement signal. The above apparatus may be located in a radio access network device, such as a first radio access network device, which is not limited thereto.

It is to be noted that the various modules described above may be implemented by software or hardware. Implementation by hardware may, but may not necessarily, be performed in the following manners: the various modules described above are located in a same processor, or the various modules described above are located in their respective processors in any combination form.

Embodiment 3

Figure 3:
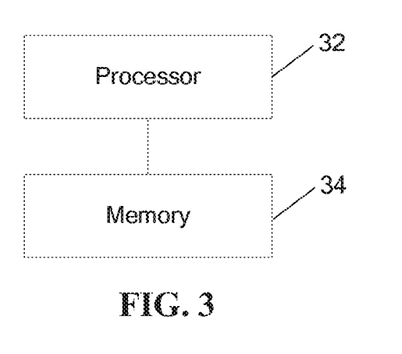
FIG. 3 is a structural block diagram illustrating a first radio access network device according to an embodiment of the present disclosure.

An embodiment of the present disclosure further provides a radio access network device (first radio access network device). FIG. 3 is a structural block diagram illustrating a first radio access network device according to the embodiment of the present disclosure. As shown in FIG. 3, the first radio access network device includes a processor 32 and a memory 34.

The processor 32 is configured to receive information about a first measurement signal of a second radio access network device reported by a terminal and perform at least one of the following operations: determining, according to association information and first information that have been obtained, whether to send a first message to the second radio access network device, where the association information indicates association between the first measurement signal of the second radio access network device and a second measurement signal of the second radio access network device, and the first information indicates whether the second measurement signal of the second radio access network device is being sent; or sending the first message to the second radio access network device. The first message carries the information about the first measurement signal of the second radio access network device reported by the terminal.

The memory 34 is coupled to the processor 32.

Through the above first radio access network device, the first radio access network device may send the first message to the second radio access network device in some cases and may not send the first message to the second radio access network device in other cases. Therefore, the second radio access network device can determine whether to start sending the second measurement signal according to whether the first message is received, and thus the problem of how to efficiently use the non-always-on measurement signals in the related art can be solved, and the utilization efficiency of resources is improved.

The first measurement signal described above may be a measurement signal which may be used by a terminal in idle-state for measurement and/or a terminal in connected-state for measurement. The first measurement signal may be, for example, a synchronization signal, but is not limited thereto. It is to be noted that the first measurement signal described above may be an always-on measurement signal, but is not limited thereto. The second measurement signal described above may be a measurement signal, such as a CSI-RS, used by a terminal in connected-state for measurement, but is not limited thereto, and the second measurement signal described above may be a non-always-on measurement signal.

In another embodiment, the processor 32 may further be configured to determine, according to the information about the first measurement signal of the second radio access network device reported by the terminal and the association information, the second measurement signal associated with the first measurement signal of the second radio access network device reported by the terminal; and decide, according to the first information, whether the determined second measurement signal is being sent; in response to determining that the determined second measurement signal is not being sent, send the first message to the second radio access network device; and in response to determining that the determined second measurement signal is being sent, not send the first message to the second radio access network device.

It is to be noted that the first information described above includes information about whether the determined second measurement signal is being sent, but is not limited thereto.

In another embodiment, the processor 32 is configured to send notification information to the terminal, where the notification information includes configuration information about the second measurement signal associated with the first measurement signal reported by the terminal.

The processor 32 may further be configured to acquire configuration information about the second measurement signal associated with the first measurement signal reported by the terminal in at least one of the following manners. Manner 1: configuration information about the second measurement signal of the second radio access network device is obtained before it is determined, according to the association information and the first information, whether to send the first message to the second radio access network device, or before the first message is sent to the second radio access network device, where the configuration information about the second measurement signal of the second radio access network device includes: the configuration information about the second measurement signal associated with the first measurement signal reported by the terminal. Manner 2: in response to determining that the configuration information about the second measurement signal of the second radio access network device is not obtained before it is determined, according to the association information and the first information, whether to send the first message to the second radio access network device, or before the first message is sent to the second radio access network device, a second message sent from the second radio access network device is received before the notification information is sent to the terminal, where the second message carries the configuration information about the second measurement signal associated with the first measurement signal reported by the terminal.

It is to be noted that for the above manner 1, the configuration information about the second measurement signal of the second radio access network device may be acquired at the same time as the association information and/or the first information described above and may not be acquired at the same time, which is not limited.

The configuration information about the second measurement signal may include at least one of the following information:
information about the second measurement signal: a beam identity of the second measurement signal or index information of the second measurement signal;
information about a cell associated with the second measurement signal: the information about the cell being represented by a cell identity;
a scrambling identity of the second measurement signal;
information about the first measurement signal associated with the second measurement signal: a beam identity of the first measurement signal or a time index of a synchronization signal block of the first measurement signal;

resource configure information of the second measurement signal; or an individual offset of the second measurement signal: the individual offset being used in evaluating signal quality of the second measurement signal.

It is to be noted that the configuration information about the second measurement signal associated with the first measurement signal reported by the terminal may be determined by the first radio access network device or may be determined by the second radio access network device.

In another embodiment, in response to determining that the association information has been obtained before it is determined, according to the association information and the first information, whether to send the first message to the second radio access network device, or before the first radio access network device sends the first message to the second radio access network device, the second measurement signal associated with the first measurement signal reported by the terminal may be determined by the first radio access network device according to the first measurement signal reported by the terminal and the association information.

In another embodiment, in response to determining that the association information is not obtained before the first radio access network device sends the first message to the second radio access network device, the second measurement signal associated with the first measurement signal reported by the terminal is determined by the second radio access network device according to the information about the first measurement signal carried in the first message and the association information stored in the second radio access network device.

The association information may include at least one of: a corresponding relationship between the information about the first measurement signal and the information about the second measurement signal; or a Quasi-Co-Location relationship between the first measurement signal and the second measurement signal. The information about the first measurement signal may include at least one of: a beam identity of the first measurement signal; or a time index of a synchronization signal block of the first measurement signal. The information about the second measurement signal may include at least one of: a beam identity of the second measurement signal; or index information of the second measurement signal. The above apparatus may be located in a radio access network device, such as a first radio access network device, which is not limited thereto.

Embodiment 4

An embodiment of the present disclosure further provides a storage medium. The storage medium includes stored programs, where when the programs are run, any method described above is executed.

In the present embodiment, the above storage medium may be configured to store program codes for executing the steps described below.

In S1, information about a first measurement signal of a second radio access network device reported by a terminal is received.

In S2, at least one of the following operations is performed: determining whether to send a first message to the second radio access network device according to association information and first information that have been obtained, where the association information indicates association between the first measurement signal of the second radio access network device and a second measurement signal of the second radio access network device, and the first information indicates whether the second measurement signal of the second radio access network device is being sent; or sending the first message to the second radio access network device; where the first message carries the information about the first measurement signal of the second radio access network device reported by the terminal.

In the present embodiment, the storage medium may include, but is not limited to, a USB flash disk, a read-only memory (ROM), a random access memory (RAM), a mobile hard disk, a magnetic disk, an optical disk or another medium capable of storing program codes.

The embodiments of the present disclosure further provide a processor. The processor is configured to run programs, where when the programs are run, the steps of any method described above are executed.

In the present embodiment, the programs described above are used for executing the steps described below.

In S1, information about a first measurement signal of a second radio access network device reported by a terminal is received.

In S2, at least one of the following operations is performed: determining whether to send a first message to the second radio access network device according to association information and first information that have been obtained, where the association information indicates association between the first measurement signal of the second radio access network device and a second measurement signal of the second radio access network device, and the first information indicates whether the second measurement signal of the second radio access network device is being sent; or sending the first message to the second radio access network device; where the first message carries the information about the first measurement signal of the second radio access network device reported by the terminal.

For examples in the present embodiment, reference may be made to the examples described in the above embodiments and implementation modes, and the examples will not be repeated in the present embodiment.

To better understand the present disclosure, the present disclosure will be further described below in conjunction with embodiments.

Figure 4:
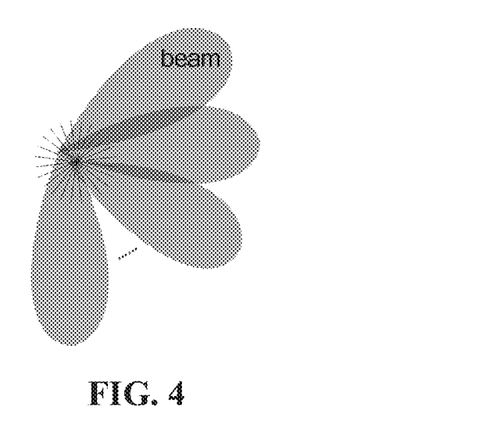
FIG. 4 is a schematic diagram illustrating sending a synchronization channel in a beamforming manner according to an embodiment of the present disclosure.

3GPP determines that a high frequency up to 52.6 GHz is to be used in 5G and in order to overcome high fading of the high frequency, the synchronization channel may adopt an SFN manner or a beamforming manner. FIG. 4 is a schematic diagram illustrating sending a synchronization channel in the beamforming manner according to an embodiment of the present disclosure. As shown in FIG. 4, when a base station sends a synchronization signal, the beamforming technology is adopted to send beams in different spatial directions to form multiple beams. The synchronization signal is used by the UE for discovering a cell and measuring the cell, and is therefore periodically sent, and when the synchronization signal is sent in the beamforming manner and multiple beams are formed in the spatial direction, the base station notifies the UE of information about the synchronization signal (referred to as synchronization signal information for short) (which is equivalent to the information about the first measurement signal in the above embodiments), where the synchronization signal information may be, for example, a beam identity of the synchronization signal or a time index of a synchronization signal block (SS block) of the synchronization signal.

For the beam identity of the synchronization signal, the synchronization signal shown in FIG. 4 is taken as an example, and if the synchronization signal includes N beams, the beam identities of the synchronization signal may be 1, 2, 3, . . . , and N.

Figure 5:
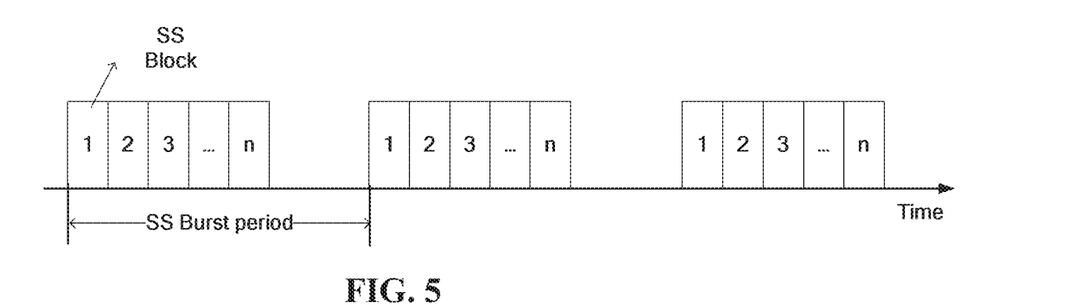
FIG. 5 is a schematic diagram illustrating a time domain pattern of a synchronization signal according to an embodiment of the present disclosure.

For the time index of the synchronization signal block of the synchronization signal, FIG. 5 is a schematic diagram of a time domain pattern of a synchronization signal according to an embodiment of the present disclosure. Taking FIG. 5 as an example, the synchronization signal is periodically sent in synchronization signal bursts (SS bursts), one SS burst includes n SS blocks, and n SS blocks in each SS burst may be numbered 1, 2, 3, . . . , and n, and the time index of the synchronization signal block (SS block) of the synchronization signal is 1, 2, 3, . . . , and n.

Figure 6:
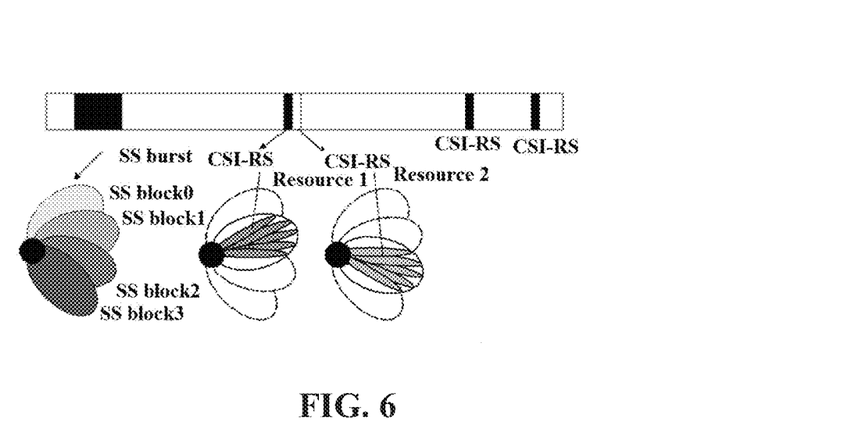
FIG. 6 is a diagram illustrating a correlation between a synchronization signal and a CSI-RS according to an embodiment of the present disclosure.

In the 5G system, two types of measurement signals, namely a synchronization signal and a CSI-RS, are designed in a connected state, and a certain correlation exists between the synchronization signal and the CSI-RS. FIG. 6 is a diagram illustrating a correlation between a synchronization signal and a CSI-RS according to an embodiment of the present disclosure. As shown in FIG. 6, the synchronization signal is sent periodically in SS bursts, each SS burst including four SS blocks. The CSI-RS is sent in a beam narrower than the beam of the synchronization signal. The CSI-RS is sent on a time-frequency domain resource, which is different from the time-frequency domain resource the SS and is called a CSI-RS resource, but a certain correlation exists between the send beam of the CSI-RS and the send beam of the synchronization signal, for example, as shown in FIG. 6, the CSI-RS sent on CSI-RS resource1 is located in the beam range of SS block1, and the CSI-RS sent on CSI-RS resource2 is located in the beam range of SS block2. Such a relationship between the SS and the CSI-RS may be represented by a corresponding relationship (equivalent to a corresponding relationship included in the association information in the above-mentioned embodiments) between the synchronization signal information and the CSI-RS information, or may also be represented by a Quasi-Co-Location (QCL) relationship (equivalent to the QCL relationship included in the association information in the above-mentioned embodiments) between the synchronization signal and the CSI-RS.

Each CSI-RS may be identified by a CSI-RS ID, and the corresponding relationship between the synchronization signal information and the CSI-RS information is the corresponding relationship between the synchronization signal information and the CSI-RS ID. Taking FIG. 6 as an example, if the time index of SS block1 is time index1 and the CSI-RS sent on CSI-RS resource1 is identified by CSI-RS ID1, the corresponding relationship between the synchronization signal information and the CSI-RS information may be represented by time index1 corresponding to CSI-RS ID1. Alternatively, if the beam identity of SS block1 is SS beam ID1 and the CSI-RS sent on CSI-RS resource1 is identified by CSI-RS ID1, the corresponding relationship between the synchronization signal information and the CSI-RS information may be represented by time index1 corresponding to CSI-RS ID1.

Each CSI-RS may be identified by a beam ID, and the corresponding relationship between the synchronization signal information and the CSI-RS information is the corresponding relationship between the synchronization signal information and the beam ID of the CSI-RS. Similarly, if the time index of SS block1 is time index1 and multiple CSI-RSs sent in the beam coverage direction of corresponding SS block1 are identified by beam ID1, beam ID2, and . . . beam IDx, respectively, the corresponding relationship between the synchronization signal information and the CSI-RS information may be represented by time index1 corresponding to {beam ID1, beam ID2, . . . , and beam IDx}. Alternatively, if the beam identity of SS block1 is SS beam ID1 and multiple CSI-RSs sent in the beam coverage direction of corresponding SS block1 are identified by beam ID1, beam ID2, and . . . beam IDx, respectively, the corresponding relationship between the synchronization signal information and the CSI-RS information may be represented by SS beam ID1 corresponding to {beam ID1, beam ID2, . . . , and beam IDx}.

The QCL relationship between the synchronization signal and the CSI-RS represents the relationship between the antenna port sending the synchronization signal and the antenna port sending the CSI-RS, and for example, when a synchronization signal having a QCL relationship with a certain CSI-RS is represented, the QCL scrambling ID and the antenna port sending the synchronization signal may be used for representation. In the QCL relationship between the synchronization signal and the CSI-RS, each synchronization signal is indexed by synchronization signal information.

Figure 7:
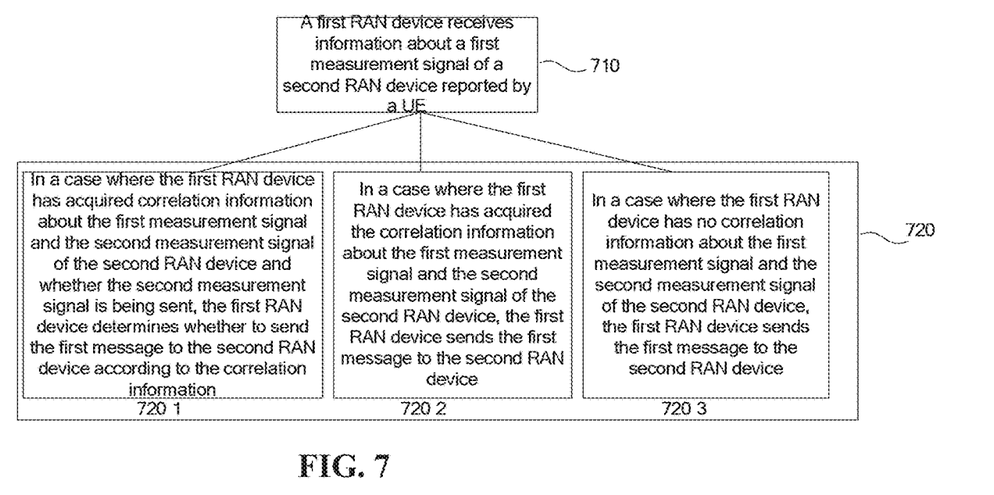
FIG. 7 is a method flowchart illustrating a measurement signal processing method according to an embodiment of the present disclosure.

FIG. 7 is a method flowchart illustrating a measurement signal processing method according to an embodiment of the present disclosure. As shown in FIG. 7, the method includes steps 710 and 720.

In step 710, a first radio access network (RAN) device receives information about a first measurement signal of a second RAN device reported by a UE (equivalent to step S102 in Embodiment 1).

The first RAN device and the second RAN device refer to devices that complete RAN functions. For example, the first RAN device and the second RAN device each may be an integrated base station that completes all RAN functions, or a device that is jointly formed by a BaseBand Unit (BBU) and a Remote Radio Unit (RRU), or a device that is jointly formed by a Central Unit (CU) and a Distributed Unit (DU), or may refer to merely a BBU or a CU in the present application. The existing form of the RAN device is not limited in the present application.

The first measurement signal refers to a measurement signal, such as a synchronization signal, that may be used by a UE in idle-state for measurement and a UE in connected-state for measurement. The UE measures a first measurement signal sent from the second RAN device, and the first measurement signal sent from the second RAN device is an always on first measurement signal or a first measurement signal being sent and configured by the first RAN device to the UE.

The UE measures the first measurement signal sent from the second RAN equipment and reports the measured information about the first measurement signal sent from the second RAN device to the first RAN device. The information about the first measurement signal is at least one of the following information:

a beam identity of the first measurement signal; or a time index of a synchronization signal block of the first measurement signal.

The UE reports the above information through a measurement report, or other RRC messages, or Media Access Control (MAC) access control information.

In step 720, after the first RAN device receives the information about the first measurement signal of the second RAN device reported by the UE, at least one of the following operations is performed.

720-1: In response to determining that the first RAN device has obtained correlation information (equivalent to the association information in the above embodiments) of the first measurement signal and the second measurement signal of the second RAN device and information (equivalent to the first information in the above embodiments) about whether the second measurement signal is being sent, the first RAN device determines, according to the correlation information, whether to send the first message to the second RAN device.

The first RAN device acquires the correlation information about the first measurement signal and the second measurement signal of the second RAN device and the information about whether the second measurement signal is being sent through a common interface flow with the second RAN device, such as interface establishment, base station configuration update, and cell configuration update.

The correlation information about the first measurement signal and the second measurement signal of the second RAN device refers to a QCL relationship between the first measurement signal of the second RAN device and the second measurement signal of the second RAN device, or a corresponding relationship between the information about the first measurement signal and the information about the second measurement signal. The information about the second measurement signal is at least one of the following information:

a beam identity of the second measurement signal; or
an index of the second measurement signal.

The step in which the first RAN device determines, according to the correlation information, whether to send the first message to the second RAN device includes a step described below.

If the first RAN device decides that the second measurement signal associated with the first measurement signal of the second RAN device reported by the UE is being sent, the first RAN device does not send the first message to the second RAN device, otherwise the first RAN device sends the first message to the second RAN device.

The first message includes the information about the first measurement signal of the second RAN device reported by the UE.

The information about the first measurement signal may be used for representing the first measurement signal and may be one of:

a beam identity of the first measurement signal or a time index of a synchronization signal block of the first measurement signal.

In this step, the first RAN device has obtained the association information about the first measurement signal and the second measurement signal of the second RAN device and the information about whether the second measurement signal is being sent. Moreover, the first RAN device may further have obtained configuration information about the second measurement signal of the second RAN device. The configuration information about the second measurement signal indicates sending characteristics of the second measurement signal in a time-frequency domain. The configuration information about the second measurement signal may include at least one of the following information:

information about the second measurement signal: a beam identity of the second measurement signal or index information of the second measurement signal;
information about a cell associated with the second measurement signal: the information about the cell being represented by a cell identity;
a scrambling identity of the second measurement signal;
information about the first measurement signal associated with the second measurement signal: a beam identity of the first measurement signal or a time index of a synchronization signal block of the first measurement signal;
resource configure information of the second measurement signal; or
an individual offset of the second measurement signal: the individual offset being used in evaluating signal quality of the second measurement signal.

720-2: In response to determining that the first RAN device has obtained the correlation information about the first measurement signal and the second measurement signal of the second RAN device, the first RAN device sends the first message to the second RAN device.

The first message includes the information about the first measurement signal of the second RAN device reported by the UE.

In this step, the first RAN device has obtained the correlation information about the first measurement signal and the second measurement signal of the second RAN device, and in addition, the first RAN device may further have obtained the configuration information about the second measurement signal of the second RAN device. The configuration information about the second measurement signal indicates sending characteristics of the second measurement signal in a time-frequency domain.

720-3: In response to determining that the first RAN device has no correlation information about the first measurement signal and the second measurement signal of the second RAN device, the first RAN device sends the first message to the second RAN device.

Here, the first RAN device and the second RAN device do not interact about the correlation information about the first measurement signal and the second measurement signal through a common interface flow; the first message includes the information about the first measurement signal of the second RAN device reported by the UE.

In the embodiment of the present disclosure, after the second RAN device receives the first message from the first RAN device, the second measurement signal associated with the first measurement signal may start to be sent according to the information about the first measurement signal included in the first message, where the information about the first measurement signal included in the first message sent from the first RAN device to the second RAN device is reported to the first RAN device by the UE; and if the second RAN device does not receive the first message from the first RAN device, the operation of sending the second measurement signal may not be performed. With the above method provided in the present application, the correlation information between the first measurement signal and the second measurement signal is used so that the purpose of efficiently using the non-always-on second measurement signal can be achieved, the use efficiency of resources is improved, and the network energy consumption is improved.

In addition, in the present method embodiment, if in step 720-1 or 720-2, the first RAN device also acquires the configuration information about the second measurement signal of the second RAN device before receiving the information about the first measurement signal of the second RAN device reported by the UE in step 710, the first RAN device may immediately notify the UE to measure a second measurement signal associated with the first measurement signal of the second RAN device reported by the UE after receiving the information about the first measurement signal of the second RAN device reported by the UE, and the notification includes the configuration information about the second measurement signal.

Figure 8:
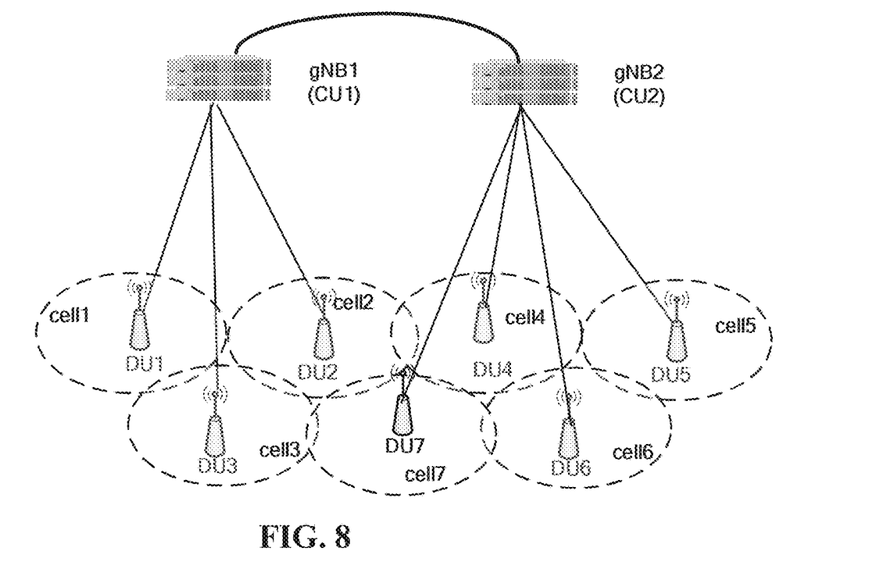
FIG. 8 is a schematic diagram illustrating a network deployment according to an embodiment of the present disclosure.

FIG. 8 is a schematic diagram illustrating a network deployment according to an embodiment of the present disclosure. As shown in FIG. 8, the RAN device gNB in the network is jointly formed by a Central Unit (CU) and a Distributed Unit (DU), where the CU and the DU may be separately deployed, one CU may be connected to multiple DUs, and different DUs under the same CU may each independently form a different cell, as shown in FIG. 8, or different DUs under the same CU may be combined to form one or more different cells. CUs of different RAN devices are connected through interfaces.

Figure 9:
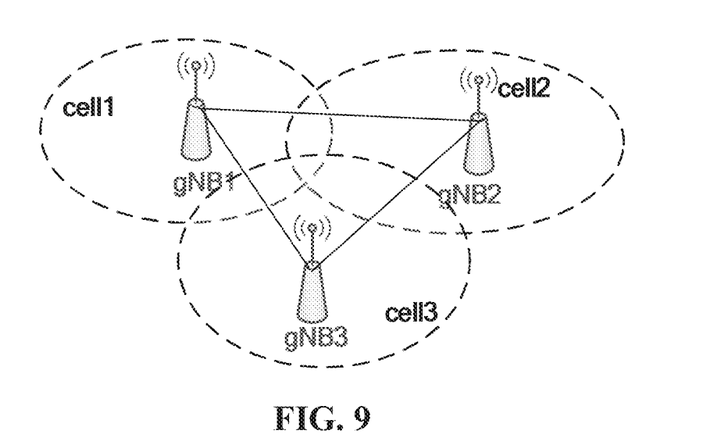
FIG. 9 is a schematic diagram illustrating another network deployment according to an embodiment of the present disclosure.

FIG. 9 is a schematic diagram of another network deployment according to an embodiment of the present disclosure. As shown in FIG. 9, the RAN device gNB in the network is an integrated base station, and the gNBs are connected through interfaces.

Embodiment One

Figure 10:
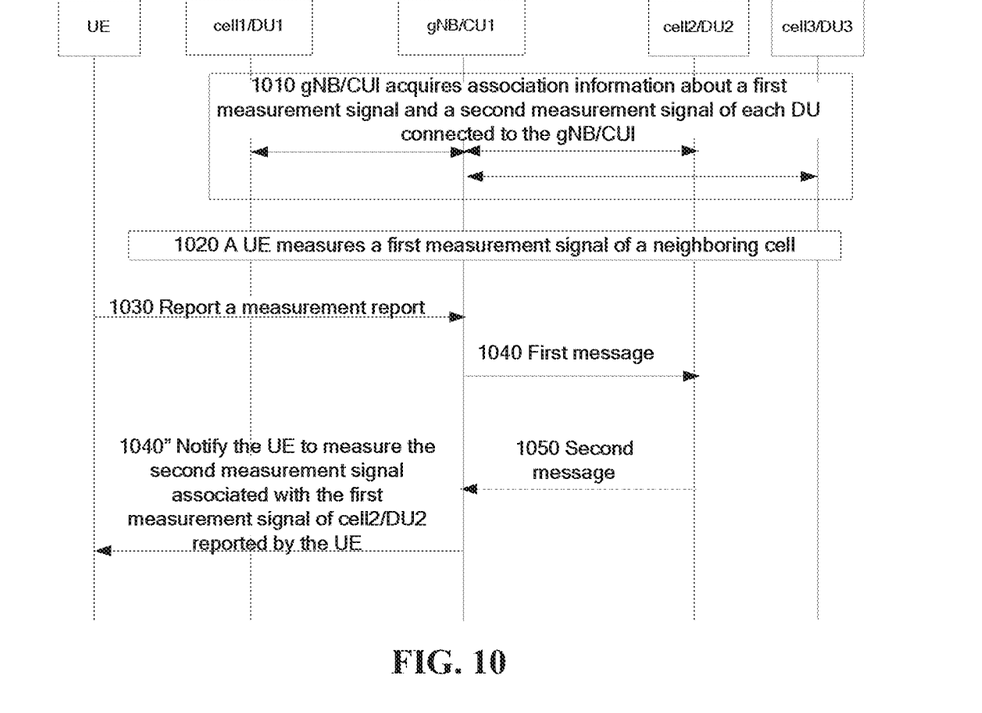
FIG. 10 is a schematic flowchart illustrating a measurement signal processing method according to Embodiment one of the present disclosure.

Embodiment one is applied to the network deployment shown in FIG. 8. In the present embodiment, a first RAN device is a CU (e.g., CU1 in FIG. 8) and a second RAN device is a DU (e.g., cell2/DU2 in FIG. 8) connected to the CU. In Embodiment one, a UE has accessed the cell1 formed by cell1/DU1 and is in a connected state. FIG. 10 is a schematic flowchart of a measurement signal processing method according to Embodiment one of the present disclosure. As shown in FIG. 10, the method includes steps described below.

In step 1010, gNB/CU1 acquires correlation information about a first measurement signal and a second measurement signal of each DU connected to the gNB/CU1.

In an embodiment, for example, gNB/CU1 acquires the correlation information about the first measurement signal and the second measurement signal of CU2, and then gNB/CU1 may acquire the correlation information about the first measurement signal and the second measurement signal in the process of establishing interface connection with cell1/DU1; or gNB/CU1 may acquire the correlation information about the first measurement signal and the second measurement signal in a subsequent cell1/DU1 configuration update or cell configuration update process after the interface connection with cell1/DU1 is established.

In step 1020, the UE measures a first measurement signal of a neighboring cell.

In the present embodiment, the UE measures the first measurement signal of cell2 formed by DU2 and acquires a beam identity or a time index of a synchronization signal block of the measured first measurement signal.

In step 1030, the UE reports a measurement report.

In this step, the UE may report the measurement report only when the signal quality of the first measurement signal satisfies the condition of gNB/CU1 configuration to the UE, or may report the measurement report when the first measurement signal is detected, and the message at the moment may appear not in the form of the measurement report, but in the form of other RRC messages.

The measurement report includes the information about the first measurement signal sent from cell2, namely DU2, and detected in step 720, and the information is the beam identity of the first measurement signal or the time index of the synchronization block of the first measurement signal.

In step 1040, gNB/CU1 sends a first message to cell2/DU2.

After receiving the measurement report reported by the UE, gNB/CU1 sends the first message to cell2/DU2, where the first message includes information about the first measurement signal sent from cell2/DU2.

In step 1050, cell2/DU2 sends a second message to gNB/CU1 (the second message includes configuration information about the second measurement signal associated with the first measurement signal in step 740).

In step 1040", gNB/CU1 notifies the UE to measure the second measurement signal associated with the first measurement signal of cell2/DU2 reported by the UE.

In the present embodiment, in step 1010, gNB/CU1 may further acquire configuration information about the second measurement signal of each DU in addition to acquiring correlation information about the first measurement signal and the second measurement signal of each DU connected to gNB/CU1. Then, gNB/CU1 sends the first message to cell2/DU2 and still perform step 740", i.e., notifying the UE to measure the second measurement signal associated with the first measurement signal of cell2/DU2 reported by the UE. The notification includes configuration information about the second measurement signal.

In the present embodiment, if gNB/CU1 does not acquire the configuration information about the second measurement signal of the DU connected to the gNB/CU1 in step 1010, cell2/DU2 decides the second measurement signal associated with the first measurement signal according to the information about the first measurement signal in the first message after the first message is received. If the second measurement signal is not being sent, the second measurement signal starts to be sent, and a second message is sent to gNB/CU1. The second message includes the configuration information (step 1050) about the second measurement signal. After gNB/CU1 receives the second message, the step 1040" is performed.

Embodiment Two

Figure 11:
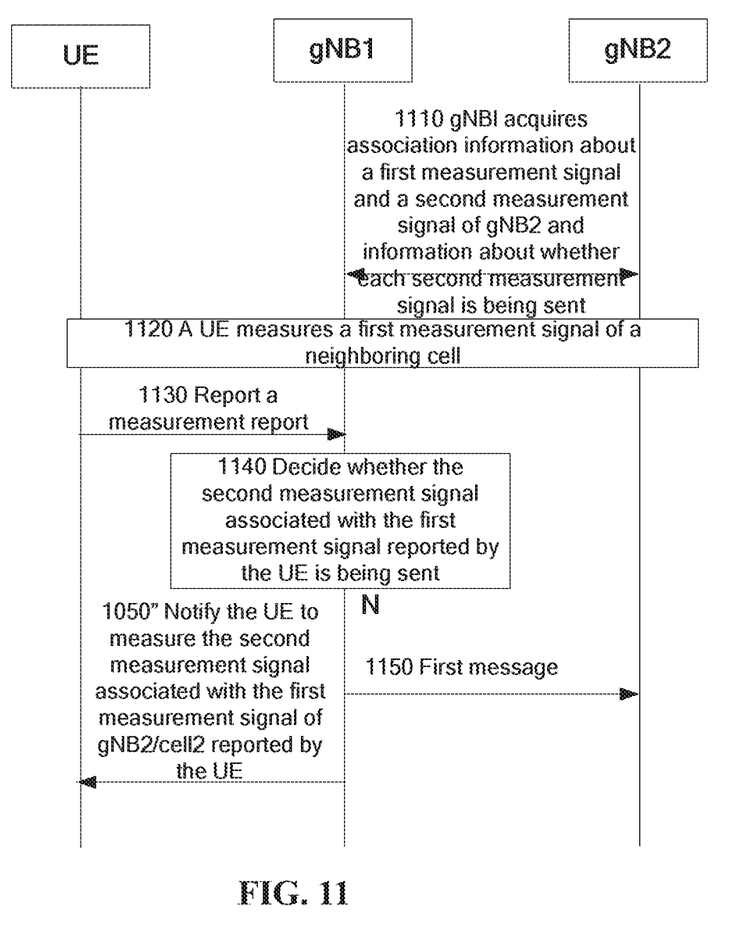
FIG. 11 is a schematic flowchart illustrating a measurement signal processing method according to Embodiment two of the present disclosure.

Embodiment two is applied to the network deployment shown in FIG. 9. In the present embodiment, a first RAN device is gNB1 and a second RAN device is gNB2. In Embodiment two, a UE has accessed cell1 formed by gNB1 and is in a connected state. FIG. 11 is a schematic flowchart of a measurement signal processing method according to Embodiment two of the present disclosure. As shown in FIG. 11, the method includes steps described below.

In step 1110, gNB1 acquires correlation information about a first measurement signal and a second measurement signal of gNB2 and information about whether each second measurement signal is being sent.

gNB1 acquires the above-mentioned information in the process of establishing interface connection with gNB2; or the gNB1 may acquire the above-mentioned information in a subsequent gNB2 configuration update or cell configuration update process after the interface connection with the gNB2 has been established.

In step 1120, the UE measures a first measurement signal of a neighboring cell.

In the present embodiment, the UE measures the first measurement signal of cell2 formed by gNB2 and acquires a beam identity or a time index of a synchronization signal block of the measured first measurement signal.

In step 1130, the UE reports a measurement report.

This step is illustrated as step 1030.

In step 1140, gNB1 decides whether the second measurement signal associated with the first measurement signal reported by the UE is being sent.

gNB1 receives the measurement report reported by the UE, and decides whether the second measurement signal associated with the first measurement signal reported by the UE is being sent according to the correlation information about the first measurement signal and the second measurement signal of gNB2 and the information about whether each second measurement signal is being sent. The correlation information and the information about whether each second measurement signal is being sent are acquired in step 1110. gNB1 also acquires configuration information about the second measurement signal of gNB2 in step 1110.

If the second measurement signal associated with the first measurement signal reported by the UE is being sent, gNB1 does not need to send any information to gNB2, and directly performs step 1150".

If the second measurement signal associated with the first measurement signal reported by the UE is not being sent, gNB1 performs step 1150, that is, gNB1 sends the first message to the gNB2. The first message includes the information about the first measurement signal of gNB2/cell2. At the same time, gNB1 performs step 1150", i.e., notifying the UE to measure the second measurement signal associated with the first measurement signal of gNB2/cell2 reported by the UE. The notification includes configuration information about the second measurement signal.

In step 1150, gNB1 sends the first message to gNB2.

The first message includes the information about the first measurement signal of gNB2/cell2.

After receiving the first message from gNB1, gNB2 decides a second measurement signal associated with the first measurement signal according to the information about the first measurement signal in the first message, and starts sending the second measurement signal.

In step 1150", gNB notifies the UE to measure the second measurement signal associated with the first measurement signal of gNB2/cell2 reported by the UE.

Embodiment Three

Figure 12:
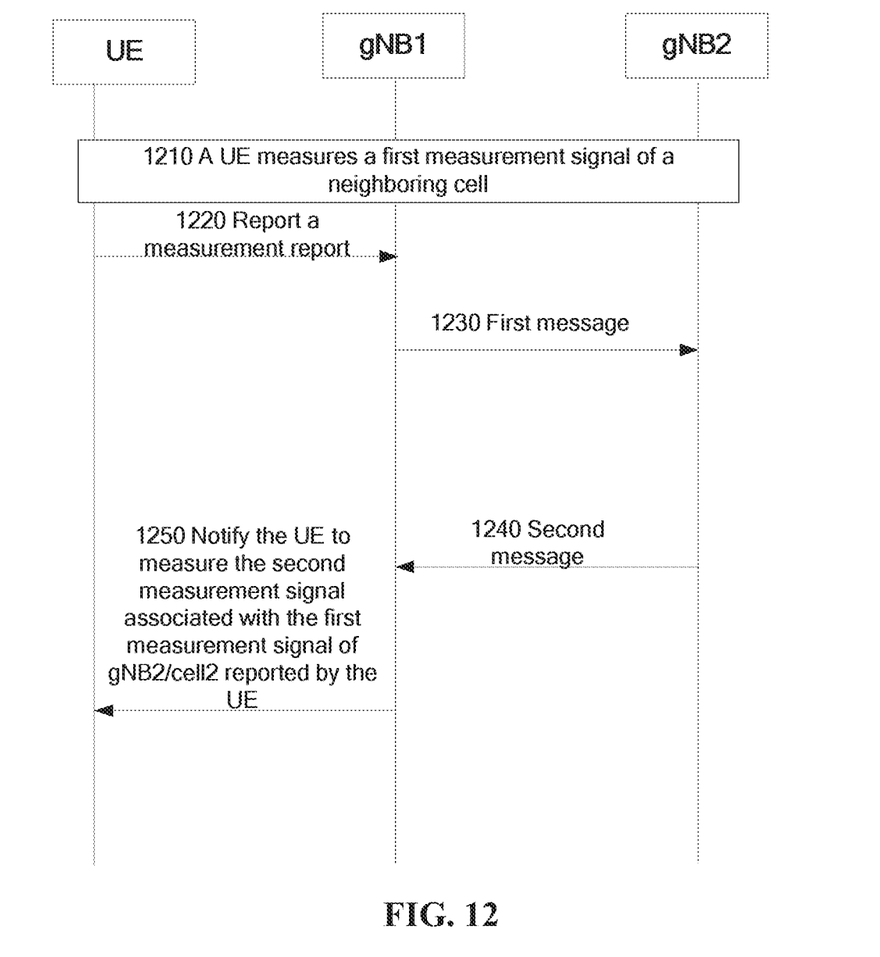
FIG. 12 is a schematic flowchart illustrating a measurement signal processing method according to Embodiment three of the present disclosure.

The application scenario of Embodiment three is the same as what is illustrated in Embodiment two. In the present embodiment, gNB1 does not acquire association information about a first measurement signal and a second measurement signal of gNB2 through a common interface flow between gNB1 and gNB2. FIG. 12 is a schematic flowchart of a measurement signal processing method according to Embodiment three of the present disclosure. As shown in FIG. 12, the method includes steps described below.

In step 1210, a UE measures a first measurement signal of a neighboring cell.

This step is illustrated as step 1120.

In step 1220, the UE reports a measurement report, where the measurement report includes information about the first measurement signal of gNB2/cell2.

In step 1230, gNB1 sends a first message to gNB2.

After receiving the measurement report reported by the UE, gNB1 sends the first message to gNB2, where the first message includes information about the first measurement signal of gNB2/cell2.

In step 1240, gNB2 sends a second message to gNB1.

The second message includes configuration information about the second measurement signal associated with the first measurement signal in step 1230.

After receiving the first message, gNB1 decides a second measurement signal associated with the first measurement signal according to the information about the first measurement signal of gNB2/cell2 included in the first message. If the second measurement signal is not being sent, the second measurement signal starts to be sent, and a second message is sent to the gNB1, where the second message includes configuration information about the second measurement signal.

In step 1250, the UE is notified to measure the second measurement signal associated with the first measurement signal of gNB2/cell2 reported by the UE. The notification includes configuration information about the second measurement signal.

It should be understood that "one embodiment" or "an embodiment" mentioned throughout the specification means that a particular feature, structure or characteristic related to the embodiments is included in at least one embodiment of the present disclosure. Therefore, the appearance of the phrase "in one embodiment" or "in an embodiment" in various places throughout the specification is not necessarily referring to the same embodiment. In addition, these particular features, structures or characteristics may be combined in one or more embodiments in any suitable manner. It should be understood that in various embodiments of the present disclosure, the serial numbers of the above processes do not mean the execution order and the execution order of the above processes should be determined according to their functions and internal logics, which should not limit the implementation processes of the present disclosure in any improper way. The serial numbers of the embodiments described above of the present disclosure are merely for ease of description and do not indicate superiority and inferiority of the embodiments.

It is to be noted that as used herein, the term "comprising", "including" or any other variant thereof is intended to encompass a non-exclusive inclusion so that a process, method, article or apparatus that includes a series of elements not only includes the expressly listed elements but also includes other elements that are not expressly listed or are inherent to such a process, method, article or apparatus. In the absence of more restrictions, the elements defined by the statement "including a . . . " do not exclude the presence of additional identical elements in the process, method, article or apparatus that includes the elements.

It should be understood that the devices and the methods disclosed in the embodiments of the present application may be implemented in other manners. The device embodiments described above are merely illustrative. For example, the unit division is merely a logical function division, and, in practice, the unit division may be implemented in other manners. For example, multiple units or components may be combined or may be integrated into another system, or some features may be omitted or not executed. All or part of the steps in the method embodiments described above may be implemented by hardware related to program instructions, these programs may be stored in a computer-readable storage medium, and when these programs are executed, included steps in the method embodiments described above are executed; and the preceding storage medium includes various media capable of storing program codes, such as a removable storage device, a read-only memory (ROM), a magnetic disk or an optical disk.

Alternatively, the above-mentioned integrated unit of the present disclosure may also be stored in the computer-readable storage medium if implemented in the form of a software function module and sold or used as an independent product. Based on this understanding, the technical solutions provided by the embodiments of the present disclosure substantially, or the part contributing to the existing art, may be embodied in the form of a software product. The computer software product is stored in a storage medium and includes several instructions for enabling a network device to perform all or part of the method provided by each embodiment of the present disclosure. The foregoing storage medium includes various media capable of storing program codes, such as a removable storage device, a ROM, a magnetic disk or an optical disk.

What is claimed is:

1. A message processing method, comprising:
after receiving information about a first measurement signal of a second radio access network device reported by a terminal, a first radio access network device performing:
determining whether to send a first message to the second radio access network device according to association information and first information that have been obtained, wherein the association information indicates association between the first measurement signal of the second radio access network device and a second measurement signal of the second radio access network device, and the first information indicates whether the second measurement signal of the second radio access network device is being sent;
wherein the first message carries the information about the first measurement signal of the second radio access network device reported by the terminal;
wherein determining whether to send a first message to the second radio access network device according to association information and first information comprises:
determining, according to the information about the first measurement signal of the second radio access network device reported by the terminal and the association information, the second measurement signal associated with the first measurement signal of the second radio access network device reported by the terminal; and
deciding, according to the first information, whether the determined second measurement signal is being sent; in response to deciding that the determined second measurement signal is not being sent, sending the first message to the second radio access network device; and in response to deciding that the determined second measurement signal is being sent, not sending the first message to the second radio access network device.

2. The method of claim 1, wherein after receiving the information about the first measurement signal of the second radio access network device reported by the terminal, the method further comprises:
sending notification information to the terminal, wherein the notification information comprises: configuration information about the second measurement signal associated with the first measurement signal reported by the terminal.

3. The method of claim 1, wherein the association information comprises one of:
a corresponding relationship between the information about the first measurement signal and information about the second measurement signal; or
a Quasi-Co-Location relationship between the first measurement signal and the second measurement signal.

4. The method of claim 1, wherein the information about the first measurement signal comprises at least one of:
a beam identity of the first measurement signal; or
a time index of a synchronization signal block of the first measurement signal.

5. The method of claim 1, wherein information about the second measurement signal comprises at least one of:
a beam identity of the second measurement signal; or
index information of the second measurement signal.

6. A first radio access network device, comprising:
a processor configured to receive information about a first measurement signal of a second radio access network device reported by a terminal and perform:
determining whether to send a first message to the second radio access network device according to association information and first information that have been obtained, wherein the association information indicates association between the first measurement signal of the second radio access network device and a second measurement signal of the second radio access network device, and the first information indicates whether the second measurement signal of the second radio access network device is being sent; wherein the first message carries the information about the first measurement signal of the second radio access network device reported by the terminal; and
a memory coupled to the processor;
wherein the processor is further configured to determine, according to the information about the first measurement signal of the second radio access network device reported by the terminal and the association information, the second measurement signal associated with the first measurement signal of the second radio access network device reported by the terminal; and decide, according to the first information, whether the determined second measurement signal is being sent; in response to determining that the determined second measurement signal is not being sent, send the first message to the second radio access network device; and in response to determining that the determined second measurement signal is being sent, not send the first message to the second radio access network device.

7. The first radio access network device of claim 6, wherein the processor is configured to send notification information to the terminal, wherein the notification information comprises: configuration information about the second measurement signal associated with the first measurement signal reported by the terminal.

* * * * *